(12) United States Patent
Hamada

(10) Patent No.: US 11,404,943 B2
(45) Date of Patent: Aug. 2, 2022

(54) METHOD AND SYSTEM OF MANUFACTURING ARMATURE COIL

(71) Applicant: DENSO CORPORATION, Kariya (JP)

(72) Inventor: Tomohiko Hamada, Kariya (JP)

(73) Assignee: DENSO CORPORATION, Kariya (JP)

(*) Notice: Subject to any disclaimer, the term of this patent is extended or adjusted under 35 U.S.C. 154(b) by 14 days.

(21) Appl. No.: 16/837,265

(22) Filed: Apr. 1, 2020

(65) Prior Publication Data

US 2020/0313524 A1    Oct. 1, 2020

(30) Foreign Application Priority Data

Apr. 1, 2019 (JP) .............................. JP2019-070199

(51) Int. Cl.
*H02K 15/00* (2006.01)
*H02K 15/06* (2006.01)
*B21D 39/00* (2006.01)

(52) U.S. Cl.
CPC ......... *H02K 15/0031* (2013.01); *B21D 39/00* (2013.01); *H02K 15/066* (2013.01)

(58) Field of Classification Search
CPC .................... H02K 15/0031; H02K 15/066
See application file for complete search history.

(56) References Cited

U.S. PATENT DOCUMENTS

| | | | | |
|---|---|---|---|---|
| 6,229,241 B1* | 5/2001 | Ishigami | ............... | H02K 15/045 310/216.069 |
| 9,960,650 B2* | 5/2018 | Tamura | ..................... | H02K 1/16 |
| 2005/0258704 A1* | 11/2005 | Oohashi | ............. | H02K 15/0485 310/216.069 |
| 2010/0045134 A1* | 2/2010 | Ciampolini | ............... | B60K 6/20 310/201 |
| 2012/0274172 A1* | 11/2012 | Koga | ........................ | H02K 3/12 310/208 |
| 2013/0193798 A1* | 8/2013 | Koga | ........................ | H02K 3/12 310/208 |
| 2015/0311757 A1 | 10/2015 | Tamura et al. | | |
| 2015/0372573 A1* | 12/2015 | Hashimoto | ............... | H02K 3/12 29/596 |
| 2017/0324291 A1* | 11/2017 | Tamura | .............. | H02K 15/0414 |
| 2019/0280543 A1 | 9/2019 | Tamura et al. | | |

* cited by examiner

*Primary Examiner* — Peter Dungba Vo
*Assistant Examiner* — Jose K Abraham
(74) *Attorney, Agent, or Firm* — Oliff PLC

(57) ABSTRACT

A method of manufacturing an armature coil includes the steps of: stacking multiple armature coils to generate a stack of armature coils in a stacking direction as a first step; securing first and second ends of the stack of armature coils with a pair of clamping dies, respectively, as a second step after completing the first step; and sandwiching and depressing the stack of armature coils with pressing die in a given direction intersecting the stacking direction as a third step after completing the second step. The pressing die includes a pair of sandwiching dies to sandwich and depress the stack of armature coils in the given direction. The pair of sandwiching dies has a narrower interval at a position closer to a first end of the stack than that at another position closer to a second end thereof.

10 Claims, 6 Drawing Sheets

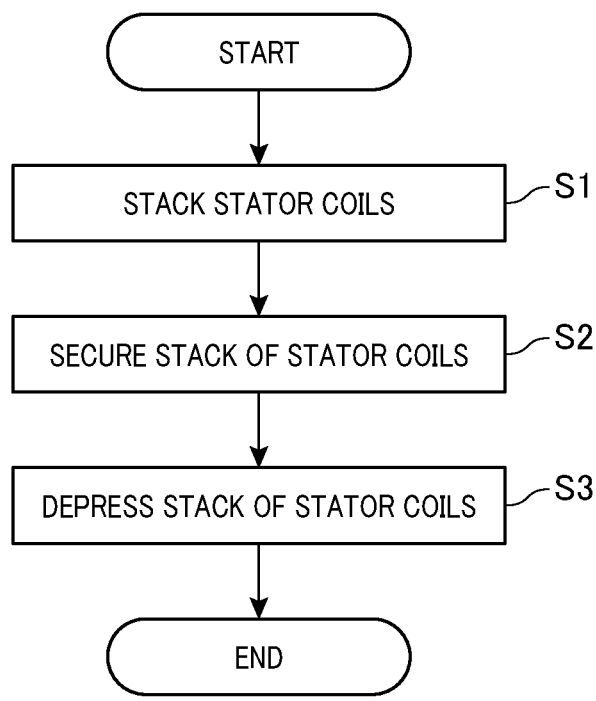

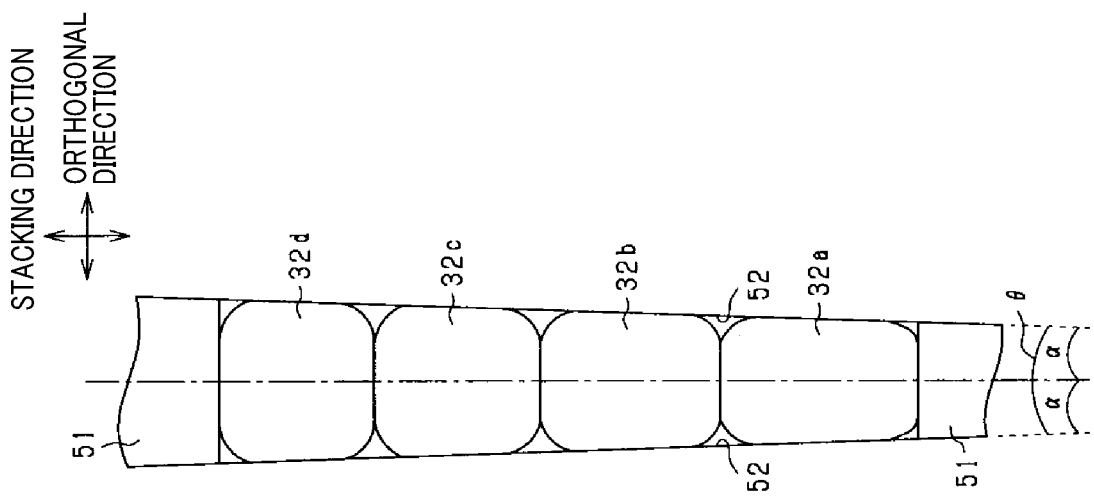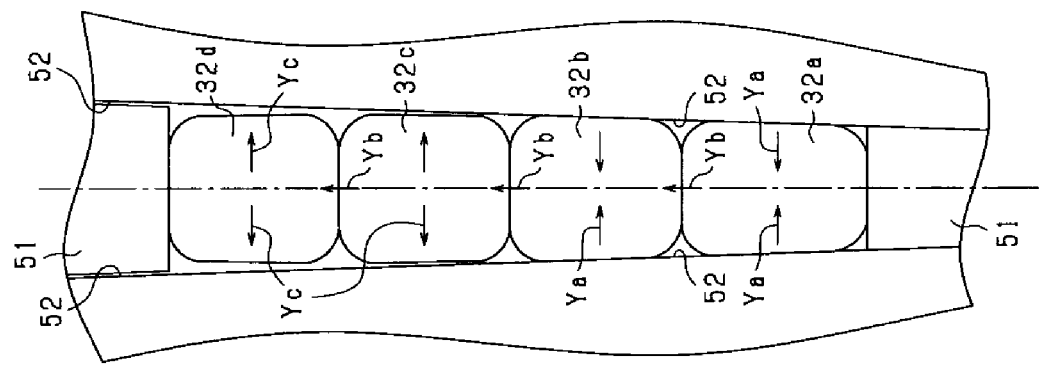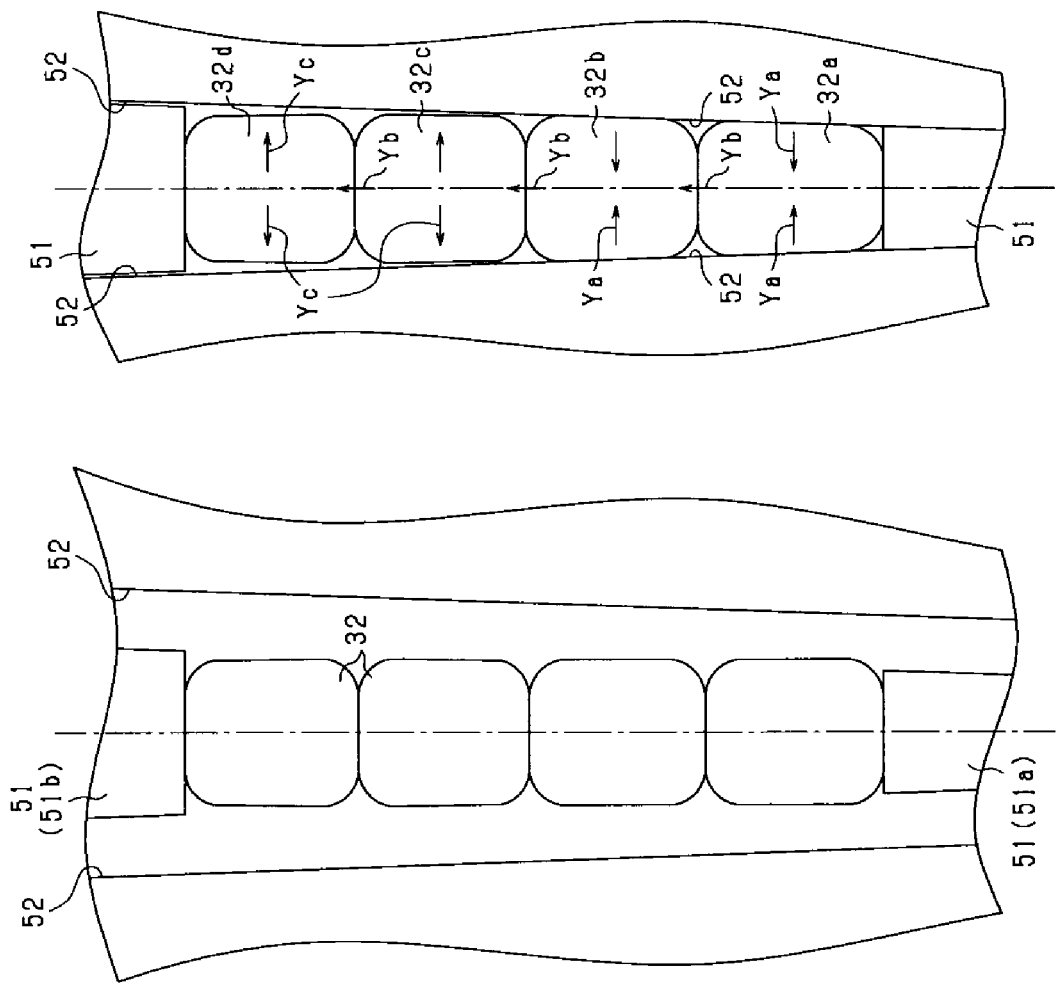

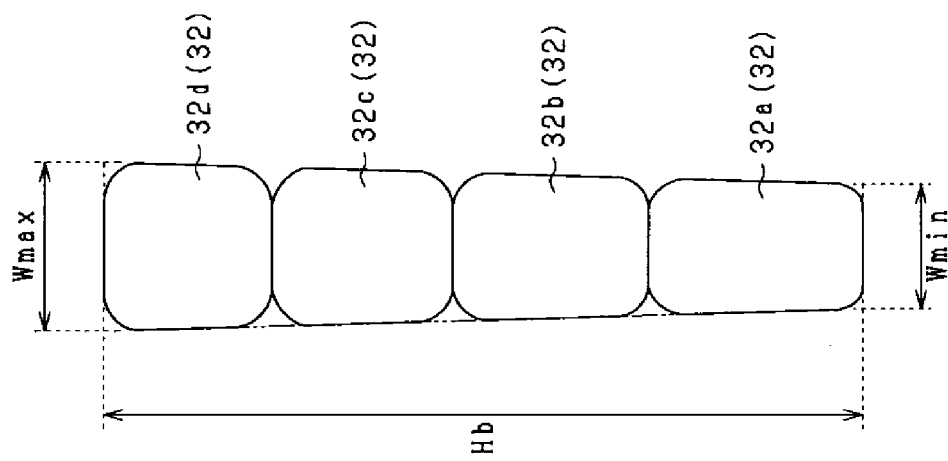
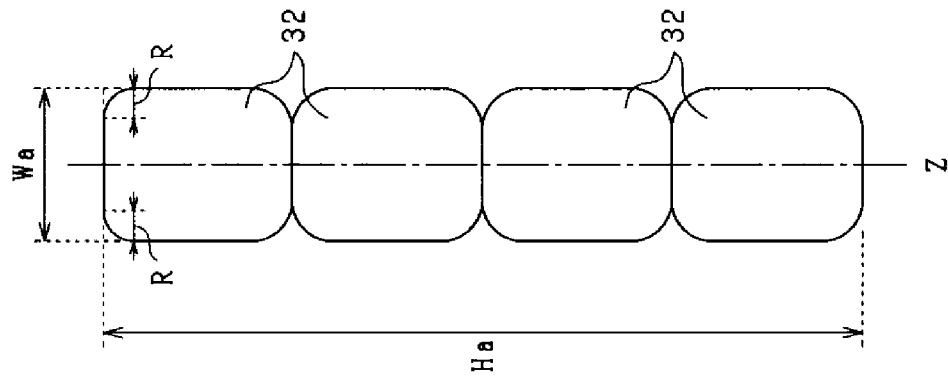

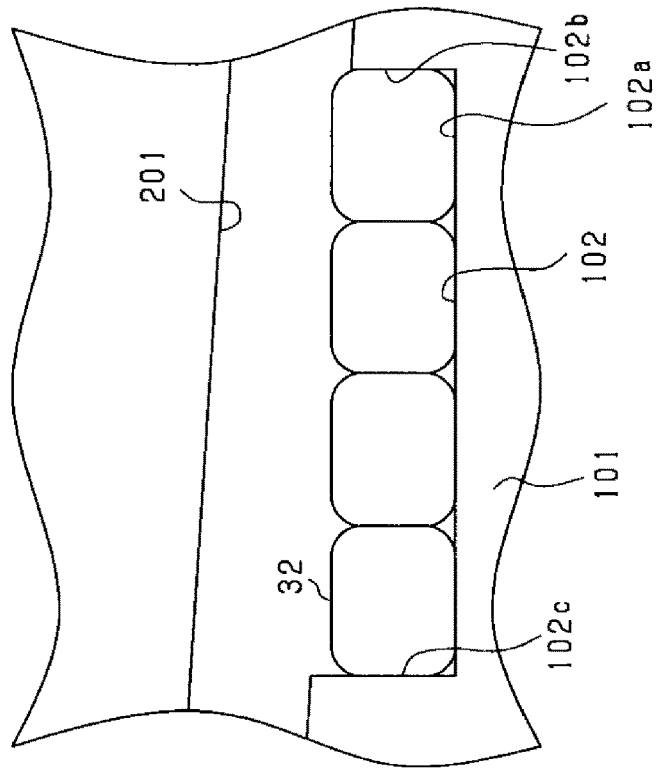
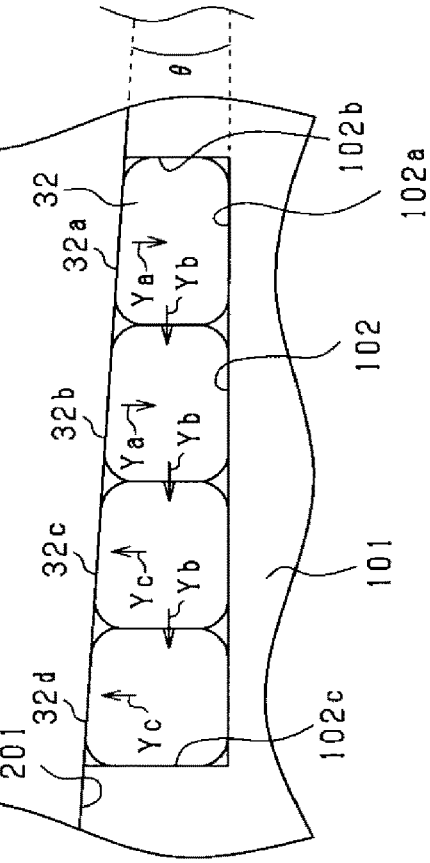

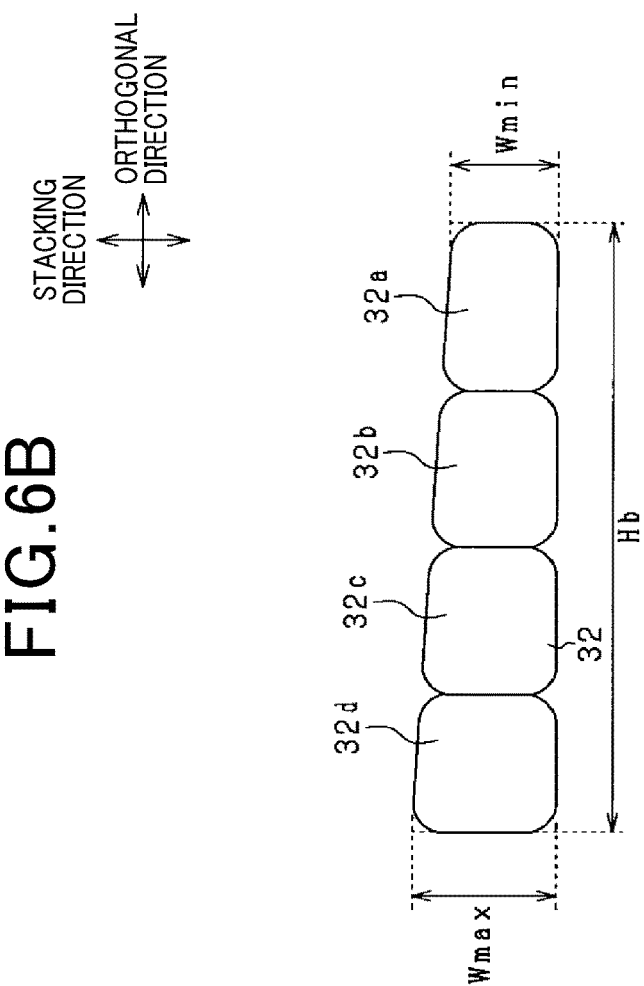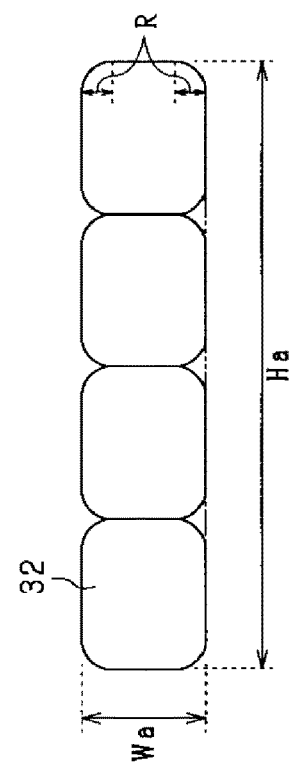

METHOD AND SYSTEM OF MANUFACTURING ARMATURE COIL

CROSS-REFERENCE TO RELATED APPLICATION

This patent application is based on and claims priority to Japanese Patent Application No. 2019-070199, filed on Apr. 1, 2019 in the Japan Patent Office, the entire disclosure of which is hereby incorporated by reference herein.

BACKGROUND

Technical Field

The present disclosure relates to a method and system of manufacturing an armature coil.

Related Art

A known rotating electric machine is composed of a hollow cylindrical stator and a rotor opposed to the hollow cylindrical stator in a radial direction. The hollow cylindrical stator has a hollow cylindrical stator core (i.e., an armature core) and stator coils (i.e., armature coils) installed in a slot formed in the stator core.

Further, to enhance a space factor of a stator coil inserted into the slot, a known stator coil is molded into a mold in a pre-molding process to fit into a slot as discussed in Japanese Patent No. 5901846 (JP-5901846-B2), for example.

According to a manufacturing method discussed in JP-5901846-B2, the stator coil is placed on a lower die having a tapering off groove substantially tailored to a shape of the slot. Then, the stator coil is depressed by an upper die having a rod-shaped tip and is thereby molded into a mold substantially having a fan shape.

However, to achieve insulation in each of the stator coils, a coil is covered by an insulating layer. Such an insulating layer covering the stator coil is desirably formed thin to enhance the space factor.

However, with the above-described manufacturing method, when the stator coil is placed on the lower die and is depressed, the insulating layer is likely to be excessively deformed and broken ultimately. Especially, since the lower die is tapered off, the closer to the tip side, the more the deformation amount, and accordingly, the insulating layer of the stator coil is easily torn at the tip.

In view of this, the present invention has been made to address the above-described problem, and it is an object to provide a method for manufacturing an armature coil capable of reducing a maximum amount of deformation of the armature coil while enhancing a space factor of the armature coil.

SUMMARY

Accordingly, one aspect of the present disclosure provides a novel method of manufacturing an armature coil installed in a slot radially extended in a stator core. The slot has a shape increasingly widened in a circumferential direction from a radial inner side to a radial outer side of the stator core. The method includes the steps of: stacking multiple armature coils to generate a stack of armature coils in a stacking direction as a first step; securing first and second ends of the stack of armature coils with a pair of clamping dies as a second step after completing the first step; and sandwiching and depressing the stack of armature coils with a pressing die in a given direction intersecting the stacking direction as a third step after completing the second step. The pressing die includes a pair of sandwiching dies to sandwich and depress the stack of armature coils in the given direction. The pair of sandwiching dies has a narrower interval at a position closer to a first end of the stack than that at another position closer to a second end thereof to mold the stack into substantially the same shape as the slot.

Another aspect of the present disclosure provides a novel manufacturing system of manufacturing an armature coil installed in a slot formed in a stator core. The slot has a shape increasingly widened in a circumferential direction from a radial inner side to a radial outer side of the stator core. The manufacturing system includes a pair of clamping dies to secure first and second ends of a stack of armature coils, respectively. The stack of armature coils is stacked in a stacking direction. The manufacturing system also includes a pressing die including a pair of sandwiching dies to sandwich and depress the stack of armature coils in a given direction intersecting the stacking direction. The pair of sandwiching dies has a narrower interval at a position closer to the first end of the stack than an interval at another position closer to the second end of the stack during molding to mold the stack into substantially the same shape as the slot.

Accordingly, according to one aspect of the present disclosure, since an interval between the pair of pressing dies located closer to the first end of the stack of armature coils in the stacking direction is narrower than an interval therebetween located closer to the second end thereof in the given direction, armature coils installed closer to the first end of the stack are initially depressed, while other armature coils installed closer to the second end of the stack are not depressed in the third step. Hence, when depression of the armature coils installed closer to the first end of the stack is started in the third step, the armature coils installed closer to the first end of the stack are deformed in the stacking direction.

When the armature coils closer to the first end of the stack are deformed in the stacking direction, the armature coils closer to the second end thereof are accordingly depressed in the stacking direction by the armature coils closer to the first end of the stack. At this moment, since deformation of the armature coils closer to the second end of the stack in the stacking direction are inhibited by the clamping die while deformation of the armature coils closer to the second end of the stack in the orthogonal direction is allowed, the armature coils closer to the second end thereof is deformed in the orthogonal direction.

However, because the pressing die is designed to substantially coincide with a shape of the slot, when the stack of armature coils is molded into a mold tailored to the shape of the slot, deformation of the armature coils closer to the second end of the stack in the orthogonal direction is inhibited. When deformation of the armature coils closer to the second end of the stack in the orthogonal direction is inhibited, deformation of the armature coils closer to the first end of the stack in the stacking direction is also inhibited.

Hence, an amount of deformation of each of the armature coils located closer to the first and second ends of the stack can be equalized. That is, in the stacking direction, armature coils closer to the second end of the stack are shortened by an amount of extension caused by armature coils closer to the first end of the stack. Similarly, in the orthogonal direction, the armature coils closer to the first end of the stack are shortened by an amount of extension caused by armature coils closer to the second end thereof. Hence, partial increase of deformation in the stack of armature coils can be prevented. Hence, by thus equalizing the amount of deformation, a maximum amount of deformation can be reduced.

Further, since the stack of armature coils is molded to substantially coincide with the shape of the slot, a space factor can be enhanced.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIG. 2 is a flowchart illustrating a method of manufacturing stator coils according to one embodiment of the present disclosure;

FIGS. 3A to 3C are schematic diagram collectively illustrating a molding process of molding stator coils according to a first embodiment of the present disclosure;

FIGS. 4A and 4B are diagrams illustrating dimensions of the stator coils according to the 1$^{st}$ embodiment of the present disclosure;

FIGS. 5A and 5B are schematic diagrams collectively illustrating a process of molding stator coils according to a second embodiment of the present disclosure; and FIGS. 6A and 6B are diagrams collectively illustrating dimensions of the stator coils according to the second embodiment.

DETAILED DESCRIPTION

Figure 1:
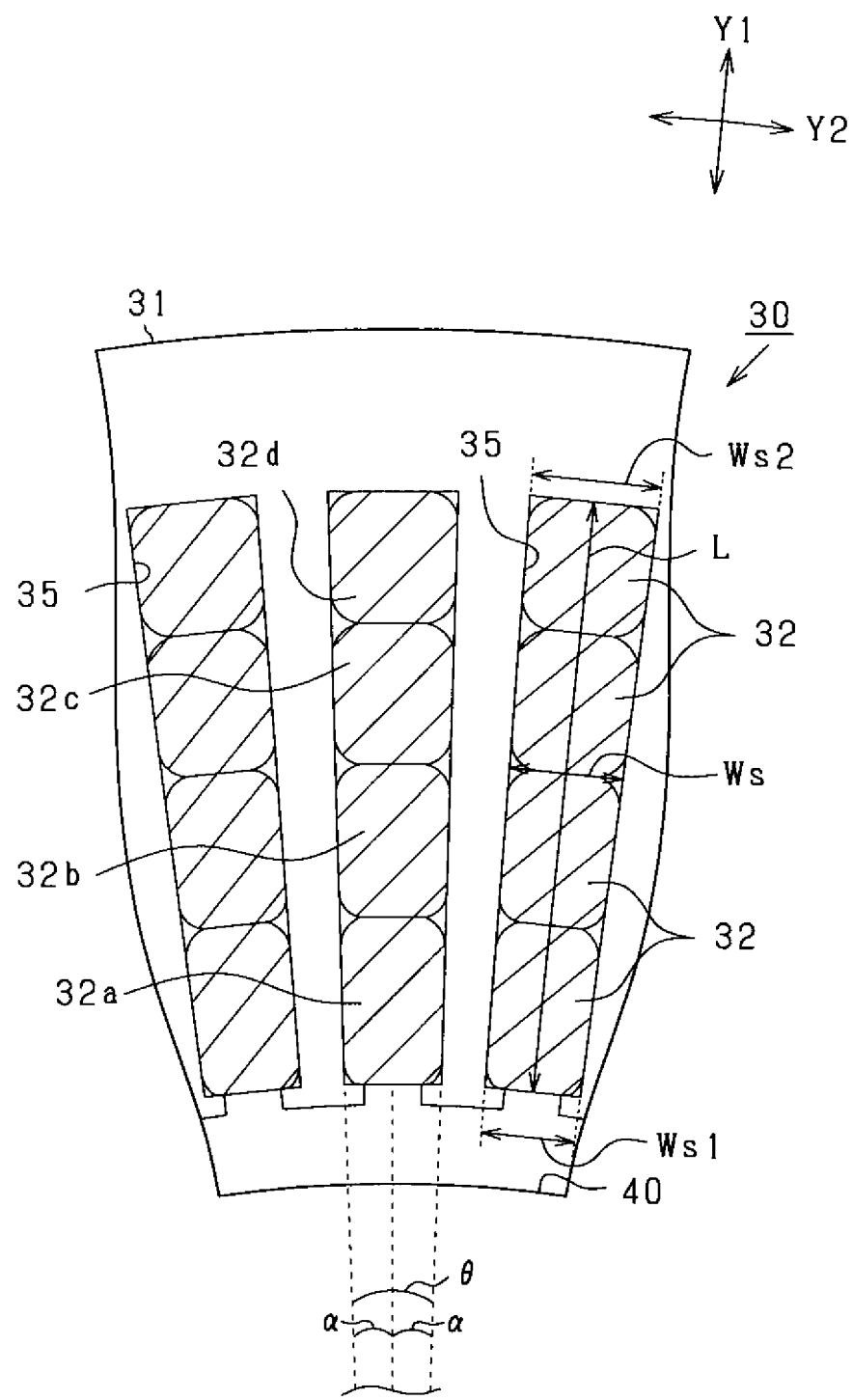
FIG. 1 is an enlarged horizontal cross-sectional view illustrating a stator according to one embodiment of the present disclosure.

Referring now to the drawings, wherein like reference numerals designate identical or corresponding parts throughout the several views thereof, and to FIG. 1, a partial cross-sectional view illustrating a stator (i.e., an armature) including multiple stator coils (i.e., armature coils) prepared according to a first embodiment of the present disclosure is described.

Specifically, the stator 30 has a hollow cylindrical stator core 31 (i.e., an armature core) and multiple stator coils 32 (i.e., armature coils) installed in the stator core 31. Herein below, a radial direction represents that of the stator core 31 as shown by arrow Y1 in applicable drawings. Also, a circumferential direction represents that of the stator core 31 as indicated by arrow Y2 in applicable drawings.

Further, as shown in FIG. 1, in the stator core 31, multiple slots 35 (i.e., multiple stator slots) are formed at a given interval in the circumferential direction thereof. The stator coils 32 are installed (disposed) in each of the slots 35.

A width Ws of the slot 35 in the circumferential direction includes a radially inner width Ws1 and a radially outer width Ws2. The outer width Ws2 is formed to be wider than the radially inner width Ws1. Further, the circumferential width Ws of the slot 35 is gradually widened as it radially extends outward from the radial inner side. That is, each of the slots 35 substantially has a fan-shape in which a radially outer side is widened relative to an inner side thereof.

The stator coils 32 are stacked radially in each of the slots 35. In this embodiment, four stator coils 32 are stacked radially. Herein below, in this embodiment, each of the four stator coils 32 is sometimes referred to as a first stator coil 32a, a second stator coil 32b, a third stator coil 32c and a fourth stator coil 32d in the order from a radially inside most stator coil.

These four stator coils 32 are molded collectively corresponding to a shape of the slot 35. That is, a stack of the four stator coils 32 has substantially a fan-shape having a widening angle θ [theta] between circumferential both end faces thereof which is substantially equivalent to a widening angle θ [theta] formed between circumferential both end faces of the slot 35.

Here, a surface of each of the stator coils 32 is covered by an insulating layer. The insulating layer is composed of an enamel layer or the like. For the purpose of enhancing a space factor of a conductor (i.e., a percentage of the conductor in the slot 35), the insulating layer is preferably thin. However, as described above, in order to enhance the space factor, the stack of stator coils 32 is molded to fit into the shape of the slot 35. In such a situation, if a deformation amount of the stack of stator coils 32 exceeds a given value during molding thereof, the insulating layer is likely to be damaged thereby causing insulation failure. In view of this, before installing it in the slot 35, the stack of stator coils 32 is pre-molded as described herein below with reference to FIGS. 2 and 3. That is, a method (i.e., a molding method) for manufacturing a stack of stator coils 32 is illustrated in detail in FIG. 2 and FIGS. 3A to 3C.

Initially, in a first step (i.e., in step S1), multiple stator coils 32 before molding are stacked in a given direction. In this embodiment, four stator coils 32 are stacked. Further, as shown in FIGS. 3A and 4A, a cross-section of each of the stator coils 32 before molding has substantially a rectangular shape. In this embodiment, each of the stator coils 32 is stacked in a longitudinal direction, so that the stack of stator coils 32 is vertically long. More specifically, each of the stator coils 32 has planes at both sides in a radial direction and is stacked such that neighboring planes contact (i.e., surface to surface contact) each other.

At that time, the stator coils 32 are stacked with respective centers thereof being aligned in a stacking direction (i.e., an up and down direction in FIGS. 3A to 4B). That is, the stator coils 32 are symmetrically stacked about a center line Z of the stack of the stator coils 32.

Herein below, a shape of each of stator coils 32 before molding thereof will be described with reference to FIGS. 4A to 4C. That is, as shown in FIG. 4A, before molding, a vertical cross-section of each of the stator coils 32 has a rectangular shape with four rounded corners. Since these stator coils 32 to be stacked are substantially identical, these stator coils 3 have substantially the same shape and cross-sectional area with each other. Herein below, a width of the stator coil 32 in the orthogonal direction (i.e., the left and right direction) before molding is referred to as Wa. Further, the total thickness of each of the stator coils 32 in the stacking direction (i.e., the vertical direction) before molding is referred to as Ha. A rounding radius of each of the four corners of each of the stator coils 32 before molding is referred to as R.

Further, as shown in FIG. 3A, the stack of stator coils 32 prepared in the first step is disposed in a first die unit 51 composed of a pair of clamping dies. Specifically, the stack of stator coils 32 is placed between a lower die 51a and an upper die 51b collectively constituting the first die unit 51. The first die unit 51 then sandwiches the stack of stator coils 32 by clamping both ends (i.e., the first and second ends) of the stack in the stacking direction with the lower die 51a and the upper die 51b. That is, the first die unit 51 serves as a movable die movable up and down in the vertical direction (i.e., in the stacking direction). Hence, in FIG. 3A, the movable die sandwiches the stack of stator coils 32 in the vertical direction.

More specifically, at the same time, both end faces of the stack of stator coils 32 contact respective surfaces of the first die unit 51 in the stacking direction. That is, as shown in FIG. 3A, a lower end face of the bottom most stator coil 32 among the four stator coils 32 contacts a surface of the lower die 51a of the first die unit 51. Also, as shown in FIG. 3A, an upper end surface of the topmost stator coil 32 among the four stator coils 32 is in contact with a surface of the upper die 51b of the first die unit 51.

Further, the first die unit 51 applies a given pressing force to the stack of stator coils 32 in the stacking direction to enable each of the stator coils 32 to tightly contact each other without a gap therebetween. At the same time, the given pressing force enables the bottom most and top most stator coils 32 to tightly contact the first die unit 51 without gaps therebetween. At that time, the stator coil 32 is desirably depressed by the first die unit 51 not to be deformed in an orthogonal direction perpendicular to the stacking direction.

Further, as shown in FIGS. 3A to 3C, a width of a planar portion (i.e., a width in the orthogonal direction) of the first die unit 51 (i.e., the die 51a) contacting the first end (i.e., the lower end) of the stack of stator coils 32 is smaller than that contacting the second end (i.e., the upper end) of the stack of stator coils 32 corresponding to a shape of the slot 35. In short, the width of the planar portion of the lower die 51a is smaller than the width Wa of each of the stack of stator coils 32 before molding. By contrast, the width of the planar portion of the upper die 51b is greater than the width Wa of each of the stack of stator coils 32 before molding. More specifically, the width of the planar portion of the lower die 51a is substantially the same or slightly smaller than a radially inner width Ws1 of the slot 35. Further, the width of the planar portion of the upper die 51b is substantially the same or slightly smaller than a radially outer width Ws2 of the slot 35.

Further, in a third step (i.e., in step S3), a second die 52 as a pressing die applies pressure to the stack of stator coils 32 in a given direction intersecting the stacking direction. Specifically, as shown in FIG. 3A, the second die 52 is disposed facing both sides of the stack of stator coils 32 in the orthogonal direction (i.e., the left and right direction in FIG. 3A) perpendicular to the stacking direction. Then, as shown in FIGS. 3B and 3C, the second die 52 applies pressure (i.e., pressing force) to the stack of stator coils 32 from both sides thereof in the orthogonal direction until it contacts the first die unit 51. Subsequently, when the third step is completed, the pre-molding of the stack of stator coils 32 is accomplished.

Herein below, a shape of the second die 52 will be described in detail with ref to FIGS. 4A and 4B and applicable drawings. That is, corresponding to the shape of the slot 35, an interval (i.e., a width in the orthogonal direction) formed in the second die 52 at a section closer to the first end (i.e., the lower end) of the stack of the stator coils 32 is narrower than an interval (i.e., a width in the orthogonal direction) formed in the second die 52 at another section closer to the second end (i.e., the upper end) of the stack of the stator coils 32. Further, as shown in FIG. 1, an angle of inclination α (alpha) of the second die 52 from the stacking direction (i.e., the vertical direction) is determined in accordance with an angle of inclination α (alpha) of the slot 35. Specifically, as shown there, the angle of inclination α (alpha) of the slot 35 corresponds to an angle made by a circumferential center line of the slot 35 and a circumferential end face thereof. That is, the angle of inclination α (alpha) of the second die 52 corresponds to half of an angle θ [theta] formed between both end faces of the slot 35 in the circumferential direction. Here, the angle of inclination α (alpha) of the second die 52 is formed at the end of molding (FIG. 3C) with respect to the stacking direction.

Hence, since it is pressed and is molded by the second die 52, the stack of stator coils 32 is molded into a mold having a shape corresponding to that of the slot 35 (see FIG. 4B) at the end of the molding. That is, a width Wmin (see FIG. 4B) of the first end of the stack of stator coils 32 in the orthogonal direction is either the same or less than the circumferential width Ws1 (see FIG. 1) of the radially inner portion of the slot 35. Further, a width Wmax (see FIG. 4B) of the second end of the stack of stator coils 32 in the orthogonal direction is either the same or less than the circumferential width Ws2 (see FIG. 1) of the radially outside portion of the slot 35. Further, a thickness Hb of the stack of stator coils 32 in the stacking direction (see FIG. 4B) is either the same or less than a radial length L of the slot 35 (see FIG. 3).

Herein below, the total thickness of the stator coils 32 (i.e., a thickness of the stack of stator coils 32) in the stacking direction (i.e., the vertical direction) after molding is referred to as Hb as shown in FIG. 4B. Also, the maximum value of a width of the stator coil 32 in the orthogonal direction (i.e., the left and right direction) after molding is referred to as Wmax, and the minimum value thereof is referred to as Wmin, respectively. That is, the width of the first end (i.e., the lower end) of the stack of stator coils 32 corresponds to Wmin, and the width of the second end (i.e., the upper end) thereof corresponds to the Wmax, respectively. Further, as shown in FIG. 4B, the width Wmin of the first end of the stack of stator coils 32 is defined by a distance between first and second intersections. The first intersection is a point at which an extension line extended along one side (i.e., a left or right side) of the stack of stator coils 32 and an extension line extended along the first end (i.e., the lower end surface) of the stack of stator coils 32 intersect. The second intersection is a point at which an extension line extended along another side (i.e., the left or right side) of the stack of stator coils 32 and an extension line extended along the first end (i.e., the lower end surface) of the stack of stator coils 32 intersect. Also, as shown in FIG. 4B, the width Wmax of the second end of the stack of stator coils 32 is defined by a distance between third and fourth intersections. The third intersection is a point at which the extension line extended along one side (i.e., a left or right side) of the stack of stator coils 32 and an extension line extended along the second end (i.e., the upper end surface) of the stack of stator coils 32 intersect. The fourth intersection is a point at which the extension line extended along another side (i.e., the left or right side) of the stack of stator coils 32 and the extension line extended along the second end (i.e., the upper end surface) of the stack of stator coils 32 intersect. Here, as shown in FIGS. 4A and 4B, each of the stack of stator coils 32 corresponds to a first stator coil 32a, a second stator coil 32b, a third stator coil 32c and a fourth stator coil 32d in order from the lower side.

Now, exemplary movement of stator coils 32 molded in a third step will be herein below described in detail with reference to FIGS. 3B and 3C.

Specifically, as described earlier, the distance (i.e., the width in the orthogonal direction) of the interval of the second die 52 at a section closer to the first end (i.e., the lower end) of the stack of the stator coils 32 is narrower than that of the second end (i.e., the upper end). Further, the width of the planar portion of the first die unit 51 (i.e., the die 51a) located closer to the first end (i.e., the lower end) of the stack of stator coils 32 is smaller than the width of each of the stator coils 32 before molding. Further, the width of the planar portion of the first die unit 51 (i.e., the die 51b) located closer to the second end (i.e., the upper end) of the stack of stator coils 32 is greater than the width of each of the stator coils 32 before molding.

Hence, as shown in FIG. 3B, in the third step, the stator coils 32 closer to the first end of the stack are firstly depressed and the stator coils 32 closer to the second end are not depressed. That is, in the third step, the first stator coil 32a and the second stator coil 32b are firstly depressed (see arrow Ya), and the third stator coil 32c and the fourth stator coil 32d located on the other side are not depressed.

Accordingly, when depression of it starts in the third step, the stator coil 32 of the first end of the stack of the stator coils 32 is deformed in the stacking direction. That is, the first stator coil 32a and the second stator coil 32b deform in the stacking direction. In such a situation, the interval of the second die 52 at a second end is wider than that at a first end thereof. In addition, both ends of the stack of stator coils 32 are sandwiched by the first die 51 in the stacking direction.

Hence, when the stator coils 32 closer to the first end of the stack are deformed in the stacking direction, the stator coil 32 closer to the second end of the stack are depressed by the stator coils 32 closer to the first end of the stack in the stacking direction. More specifically, the first stator coil 32a and the second stator coil 32b are deformed to depress the third stator coil 32c and the fourth stator coil 32d located closer to the second end in the stacking direction (see arrow Yb).

At that time, since deformation of the stator coils 32 closer to the second end in the stacking direction is inhibited while deformation thereof in the orthogonal direction orthogonal to the stacking direction is allowed, the stator coils 32 closer to the second end in the stacking direction deform in the orthogonal direction. That is, as shown in FIG. 3B, since the third stator coil 32c and the fourth stator coil 32d located closer to the second end are not depressed by the second die 52, the third stator coil 32c and the fourth stator coil 32d are deformed in the orthogonal direction (see arrow Yc).

Since the second die 52 is formed in accordance with the shape of the slot 35, when the molding of the stack of stator coils 32 is completed in accordance with the shape of the slot 35, deformation of the stator coils 32 (i.e., the third stator coil 32c and the fourth stator coil 32d) located closer to the second end in the orthogonal direction is inhibited by the second die 52. Further, when deformation of the stator coils 32 closer to the second end (i.e., the third stator coil 32c and the fourth stator coil 32d) in the orthogonal direction is inhibited, deformation of the stator coils 32 (i.e., the first stator coil 32a and the second stator coil 32b) closer to the first end of the stack in the stacking direction is accordingly inhibited. With this, the stack of stator coils 32 is molded into a mold having a shape tailored to the shape of the slot 35.

Herein below, a shape of each of the stator coils 32 before and after molding will be described more in detail.

That is, in this embodiment, a width (i.e., Wa−2R) of a plane of the stator coil 32 excluding corner portions thereof before molding is smaller than a minimum width Wmin among widths of stator coils after molding. That is, shapes of a stator coil 32 before and after the molding are determined to satisfy the below described in equation (relation).

$$Wa-2R < W\text{min}$$

(i.e., $2R > Wa - W\text{min}$)

Further, the width Wa of each of the stator coils 32 in the orthogonal direction before molding is made greater than the width Wmin of the first end of the stack of stator coils 32 after molding and smaller than the width Wmax of the second end at the same time. That is, the width Wa of each of the stator coils 32 in the orthogonal direction before molding is adjusted to satisfy the below described in equation.

$$W\text{min} < Wa < W\text{max}$$

More specifically, the width Wa of each of the stator coils 32 in the orthogonal direction before molding is an average of the width Wmin of the first end of the stack of stator coils 32 after molding and the width Wmax of the second end thereof after molding. In other words, the below described equation is satisfied.

$$Wa = (W\text{min} + W\text{max})/2$$

Further, the total thickness Hb of the stator coils 32 in the stacking direction after molding is either the same or less than the total thickness Ha of the stator coils 32 before molding (i.e., Hb≤Ha).

Further, the width Wa of each of the stator coils 32 before molding is greater than a size twice as much as the rounding radius R. That is, the below described in equation is established.

$$Wa > 2R$$

In other words, a plane is always included in each of the stator coils 32. Further, the planar portion (i.e., the portion contacted by the end face of the stack of stator coils 32) of the first die unit 51 is longer than a planar portion of the stack of stator coils 32. Thus, a face of the first die unit 51 can contact a face of the stack of stator coils 32.

Now, at least one advantage obtained in the above-described embodiment will be described herein below.

First, since the stack of stator coils 32 is molded as described above, an amount of deformation in each of the stator coils 32 from the first end of the stack of stator coils 32 to the second end thereof can be easily equalized. That is, the stator coils 32 located closer to the second end of the stack shrink in the stacking direction by an amount by which the stator coils 32 located closer to the first end of the stack are extended in the stacking direction. Also, the stator coils 32 located closer to the second end of the stack are extended in the orthogonal direction by an amount by which the stator coil 32 located closer to the first end of the stack shrink in the orthogonal direction.

More specifically, the third stator coil 32c and the fourth stator coil 32d collectively shrink in the stacking direction by an amount by which the first stator coil 32a and the second stator coil 32b are collectively extended in the stacking direction. Also, the third stator coil 32c and the fourth stator coil 32d are extended in the orthogonal direction in total by an amount by which the first stator coil 32a and the second stator coil 32b collectively shrink in the orthogonal direction.

Hence, since the stator coils 32 are alternately expanded and shrink, eccentric increase in deformation can be prevented in the stack of stator coils 32. Since the deformation amount of each of the stator coils 32 can be easily equalized in this way, the maximum amount of deformation can be reduced. In other words, insulation failure can be accordingly suppressed. At the same time, since the stack of stator coils 32 is molded to fit into the shape of the slot 35, the space factor can be enhanced.

Further, when a stack of stator coils 32 is molded with a center of each of the stator coils 32 not aligned, a direction of force transmission, and accordingly, deformation of each of the stator coils 32 tends to vary. In other words, the stack of stator coils 32 tends to become distorted. In view of this, the stator coils 32 are coaxially stacked in the stacking direction (i.e., with a center of each of the stator coils 32 being aligned) in the first step. With this, each of the stator coils 32 can be deformed substantially in the same manner, and an amount of deformation thereof can be easily equalized.

Further, a cross-section of each of the stator coils 32 before molding is rectangular. Hence, in the first step, the stator coils 32 are stacked such that neighboring planes of the stator coils 32 contact each other. Further, in the second step, both end faces of the stack of stator coils 32 in the stacking direction are clamped and the stack of stator coils 32 is thereby sandwiched by the first die unit 51. Hence, since faces of the stator coils 32 contact each other and both side faces of the stack of the stator coils 32 contact the first die unit 51, force can be evenly applied and received from each of the stator coils 32 in the stacking direction. In other words, partially great deformation can be either suppressed or reduced easily, and accordingly, an amount of deformation can be readily equalized.

Further, when the width of the plane of each of the stator coils 32 before molding is greater than the minimum width (among the widths) of the stator coils 32 after molding and the stator coils 32 are depressed in the orthogonal direction in the third step, the plane of each of the stator coils 32 is likely to be distorted and both sides thereof in the orthogonal direction may be greatly deformed.

Hence, in this embodiment, four rounded corners are provided to each of the stator coils 32 before the molding. Further, the width of the plane of each of the stator coils 32 excluding the corners before molding in the orthogonal direction is smaller than the minimum width among the widths of the stator coils after molding. That is, the shape of each of the stator coils 32 is determined to satisfy the below described in equation before and after the molding, wherein Wa represents a width in the orthogonal direction of the stack of stator coils 32 before molding, R represents a rounding radius of each of corners of each of the stator coils 32 before molding and Wmin represents a minimum value of a width of the stator coils 32 after molding.

$$Wa - 2R < Wmin$$

With this, a shape of the plane of each of the stator coils 32 can be maintained before and after molding, and accordingly partially great deformation can be either prevented or reduced.

Further, the width Wa of each of the stator coils 32 in the orthogonal direction before molding is greater than the width Wmin of the first end of the stack of the stator coils 32 and smaller than the width Wmax of the second end thereof after molding. More specifically, the width Wa of each of the stator coils 32 in the orthogonal direction before molding is the average of the width Wmin of the first end of the stack of the stator coils 32 and the width Wmax of the second end thereof after molding. Thus, since the stator coils 32 closer to the first end of the stack can be easily deformed in the stacking direction while the stator coils 32 closer to the second end thereof are easily deformed in the orthogonal direction, a deformation amount of each of the stator coils 32 can be easily equalized.

Further, the total thickness Hb of the stack of stator coils 32 in the stacking direction after molding is either the same or less than the total thickness Ha of the stack of stator coils 32 before molding. That is, by designing the first die unit 51 to be movable, the stack of stator coils 32 can be compressed in the stacking direction. Thus, the space factor can be enhanced. Further, since the first die unit 51 can adjust a deformation amount in each of the stacking and orthogonal directions, the deformation amount can be more easily equalized.

Further, among the stator coils 32 of the stack disposed in the slot 35, the stator coils 32 disposed radially inward are thicker in the radial direction than the stator coils 32 disposed radially outward. Further, among the stator coils 32 of the stack disposed in the slot 35, the stator coils 32 disposed radially outward are wider in the circumferential direction than the stator coils 32 disposed radially inward. In this way, by varying the direction of deformation of each of the stator coils 32 stacked from the radially inside to the outside, an amount of deformation thereof can be equalized and accordingly the maximum deformation amount can be reduced when the stack of stator coils 32 is molded.

Further, the width Wa of each of the stator coils 32 before molding is greater than twice as large as the rounding radius R to meet the below described in equation.

$$Wa > 2R$$

In other words, a plane is always included in each of the stator coils 32. Further, each of the planar portions of the first die unit 51 (i.e., the portions contacted by the end faces of the stack of stator coils 32) is longer than each of the planar portions of the stack of stator coils 32. Thus, since the faces of first die unit 51 can contact the faces of the stack of stator coils 32, partial great deformation can be either suppressed or reduced.

Further, the first die unit 51 is designed to be movable and sandwiches the stack of stator coils 32 by clamping the both ends thereof. Hence, even if a dimensional error occurs in the stator coil 32, both sides thereof can be safely secured without a gap therebetween.

Now, a second embodiment of the present disclosure is described with reference to FIGS. 5A to 6B. In the second embodiment, the die used in the first embodiment is modified as will be described herein below in detail.

First, in a first step (i.e., in step S1 (see FIG. 2)) of the second embodiment, four stator coils 32 are stacked in a horizontal direction (i.e., placed side by side (herein below the same)) as shown in FIG. 5A and FIG. 6A. That is, a longitudinal direction of a stack of stator coils 32 aligns with the horizontal direction. In the first step, the stator coils 32 are stacked such that neighboring planes of the stator coils 32 contact each other.

Here, as shown in FIG. 6A, in the second embodiment, a width of the stack of stator coils 32 before molding in an orthogonal direction (i.e., a vertical direction) is herein below referred to as Wa. Further, a total thickness in the stacking direction (i.e., in a left and right direction) of the stack of stator coils 32 before molding is referred to as Ha. A rounding radius of each of corners of each of the stator coils 32 before molding is referred to as R.

Further, as shown in FIG. 5A, a stack of stator coils 32 is placed on a lower die 101 in a second step (i.e., in step S2). The lower die 101 includes a recess 102 having a bottom surface 102a. Hence, the stack of stator coils 32 is placed on the bottom surface 102a of the recess 102. Because the bottom surface 102a is horizontal, when the stack of four stator coils 32 is placed on the bottom surface 102a, a center of each of the four stator coils 32 can be easily aligned.

Further, a pair of walls 102b and 102c is provided in the recess 102 and is composed of vertical planes perpendicular to the bottom surface 102a. Here, in FIGS. 5A and 5B, the wall 102b serves as a right wall and the wall 102c serves as a left wall.

These walls 102b and 102c are separated by a distance as same as the total thickness Ha of the stack of stator coils 32 before molding in the horizontal direction. That is, the horizontal width of the bottom surface 102a is the same as the total thickness Ha of the stack of stator coils 32. Hence, when the stack of four stator coils 32 is placed in the recess 102 of the lower die 101, both ends of the stack of four stator coils 32 are secured in the stacking direction. Further, at the same time, both ends of the stack of stator coils 32 in the stacking direction contact surfaces of the walls 102b and 102c (acting as a first die unit 51 shown in FIG. 3A to 3C), respectively. Hence, the stator coils 32 of the stack pressure contact each other, and both left and right ends of the stack of stator coils 32 pressure contact the walls 102b and 102c, respectively, without a gap therebetween. That is, in the second embodiment, the walls 102b and 102c act as a clamping die in the present disclosure.

Further, as shown in FIGS. 5A and 5B, the wall 102b (located right) facing the first end of the stack of the stator coils 32 is lower than the wall 102c (located left) facing the second end thereof. Specifically, a height of the right wall 102b is smaller than the width Wa of each of the stator coils 32 of the stack before molding. By contrast, a height of the left wall 102c is greater than the width Wa of each of the stator coils 32 of the stack before molding. Further, the height of the right wall 102b is either substantially the same or slightly smaller than a radially inner width Ws1 (see FIG. 1) of the slot 35. Also, the height of the left wall 102c is either substantially the same or slightly smaller than a radially outer width Ws2 (see FIG. 1) of the slot 35.

Further, in the third step (i.e., in step S3), an upper die 201 depresses the stack of stator coils 32 in a given direction intersecting the stacking direction (i.e., the horizontal direction) thereof. Specifically, as shown in FIG. 5A, the upper die 201 is disposed above the lower die 101 in the orthogonal direction (i.e., the vertical direction in FIGS. 5A and 5B) perpendicular to the stacking direction. Then, as shown in FIG. 5B, the upper die 201 is pressed and depresses the stack of stator coils 32 from above (as press working) until the upper die 201 becomes in contact with a part of the lower die 101. Hence, when the third step is completed, pre-molding of the stack of stator coils 32 is accomplished.

Herein below, a shape of the upper die 201 will be described in detail with ref to FIGS. 5A to 6B. First, an interval between the upper die 201 and the bottom surface 102a or the like is described. That is, the first end (i.e., the right side) of the stack of stator coils 32 is narrower than the second end (i.e., the left side) of the stack of stator coils 32 to substantially coincide with a shape of the slot 35. Specifically, an angle of inclination θ [theta] of the upper die 201 relative to the bottom surface 102a (i.e., in the horizontal direction) is determined to match with an angle θ [theta] formed by both side inner surfaces of the slot 35 (see FIG. 3C).

Hence, when it is depressed by the upper and lower dies 201 and 101 thereby molded at the end of molding, the stack of multiple stator coils 32 has a shape substantially coinciding with the slot 35 as described below. That is, a width Wmin of the first end (i.e., the right end) of the stack of stator coils 32 (in the orthogonal direction) is either the same or less than the width Ws1 of a radially inner portion of the slot 35 in the circumferential direction. Also, a width Wmax of the second end (i.e., the left end) of the stack of stator coils 32 in the orthogonal direction is either the same or less than a width Ws2 of a radially outside portion of the slot 35 in the circumferential direction. Further, a thickness Hb of the stack of stator coils 32 (in the stacking direction) is either the same or less than a radial length L of the slot 35.

Here, as shown in FIG. 6B, in the stacking direction (i.e., the left and right direction), a total thickness of the stator coils 32 (i.e., a thickness of the stack) after molding is herein below referred to as Hb. Here, the total thickness Hb is substantially the same as the total thickness Ha of the stator coils 32 before molding.

Further, herein below, a maximum width of an applicable stator coil 32 in the orthogonal direction (i.e., the vertical direction) after molding is referred to as Wmax, and a minimum width thereof, Wmin, respectively. Specifically, a width of the first end of the stack of stator coils 32 (the right end in FIGS. 6A and 6B) corresponds to the minimum width Wmin, and a width of the second end of the stack of stator coils 32 (the left end in FIG. 6) corresponds to the maximum width Wmax. Further, as shown in FIG. 6B, the width Wmin of the first end of the stack of stator coils 32 is defined by a distance between a first intersection and a second intersection. The first intersection is a point at which an extension line extended along one side of the stack of stator coils 32 and an extension line extended along the first end (i.e., the right side) of the stack of stator coils 32 intersect. The second intersection is a point at which an extension line extended along another side of the stator coils 32 and the extension line extended along the first end (i.e., the right side) of the stack of stator coils 32 intersect. Further, as shown in FIG. 6B, the width Wmax of the second side end of the stack of stator coils 32 is defined by a distance between a third intersection and a 4th intersection. The third intersection is a point at which the extension line extended along one side of the stack of stator coils 32 and an extension line extended along the second side end (i.e., the left side) of the stack of stator coils 32 intersect. The 4th intersection is a point at which the extension line extended along the other side of the stack of stator coils 32 and the extension line extended along the second side end (i.e., the left side) of the stack of stator coils 32 intersect.

Further, as shown in FIGS. 6A and 6B, in the present disclosure, each of the stator coils 32 corresponds to a first stator coil 32a, a second stator coil 32b, a third stator coil 32c and a fourth stator coil 32d in order from the right side, respectively.

Now, exemplary movement of stator coils 32 molded in a third step will be herein below described in detail with reference to FIGS. 5A and 5B.

First, an interval (i.e., a width in the orthogonal direction) between the upper die 201 and the bottom surface 102a is initially described. That is, the first end (i.e., the right side) of the stack of stator coils 32 is narrower than the second end (i.e., the left side) thereof. Further, the height of the right-side wall 102b is smaller than the width Wa of the stack of stator coils 32 before molding. In addition, the height of the left side wall 102c is greater than the width Wa of the stack of stator coils 32 before molding.

Hence, in the third step, as shown in FIGS. 5A and 5B, the stator coils 32 closer to the first end (i.e., the right side) of the stack are depressed firstly, while the stator coils 32 closer to the second end thereof are not depressed. Specifically, in the third step, the first stator coil 32a and the second stator coil 32b are initially depressed (see arrow Ya) but the third stator coil 32c and the fourth stator coil 32d closer to the second end of the stack of stator coils 32 are not depressed.

Hence, when depression of the stator coils 32 closer to the first end (i.e., the right side) of the stack is initiated in the third step, these stator coils 32 are deformed in the stacking direction (i.e., the horizontal direction or the left and right direction) as a result. That is, the first stator coil 32a and the second stator coil 32b are deformed in the stacking direction. At this moment, the distance between the upper die 201 and the bottom surface 102a at the second side end of the recess 102 is greater than that at the first side end of the recess 102. In addition, both sides of the stack of stator coils 32 are secured by the left and right-side walls 102b and 102c in the stacking direction so that the stack is thereby sandwiched.

Hence, when the stator coils 32 closer to the first end (i.e., the right side) of the stack are deformed in the stacking direction, the stator coils 32 closer to the second end (i.e., the left side) of the stack are depressed by the stator coils 32 closer to the first end in the stacking direction. That is, the first and second stator coils 32a and 32b are deformed to depress the third and fourth stator coils 32c and 32d in the stacking direction (see arrow Yb).

Further, deformation of the stator coils 32 closer to the second end (i.e., left side) of the stack in the stacking direction are inhibited by the walls 102b and 102c, while deformation of the stator coils 32 is allowed in the orthogonal direction, the stator coils 32 closer to the second end (i.e., left side) of the stack are deformed in the orthogonal direction. That is, as shown in FIG. 5B, since the third stator coil 32c and the fourth stator coil 32d are not depressed by the upper die 201, the third stator coil 32c and the fourth stator coil 32d may be deformed in the orthogonal direction (see arrow Yc).

Further, when the stack of stator coils 32 has been molded in accordance with the shape of the slot 35, since the upper die 201 and the bottom surface 102a of the lower die 101 are formed to substantially coincide with the shape of the slot 35, deformation of the stator coils 32 (i.e., the third stator coil 32c and the fourth stator coil 32d) closer to the second end (i.e., the left side) of the stack of stator coils 32 in the orthogonal direction is inhibited by the upper die 201 and the bottom surface 102a of the lower die 101. Subsequently, when deformation of the stator coils 32 (i.e., the third stator coil 32c and the fourth stator coil 32d) closer to the second end of the stack in the orthogonal direction is inhibited, deformation of the stator coils 32 (i.e., the first stator coil 32a and the second stator coil 32b) closer to the first end of the stack in the stacking direction is accordingly inhibited. As a result, the stack of stator coils 32 is molded into a mold having a shape tailored to the shape of the slot 35. Hence, in the second embodiment, the upper die 201 and the bottom surface 102a collectively correspond to a pressing die in the resent disclosure.

Thus, various advantages as obtained in the first embodiment can be similarly obtained in the second embodiment. Further, since multiple stator coils 32 are placed on the bottom surface 102a in the first step, a center of each of the stator coils 32 can be easily aligned. Further, since the walls 102b and 102c are utilized to secure both ends of the stack of stator coils 32, the die can be more easily manufactured than the movable first die unit 51.

Modifications of the above-described embodiments are herein below described. That is, the present invention is not limited to the above-described embodiments, and various modifications can be performed within a scope of a gist of the present invention.

For example, although it is movable in the first embodiment, the first die unit 51 may be fixed type. Further, although the stack of stator coils 32 is depressed by the second die 52 in the orthogonal direction in the first embodiment, the depression direction may be arbitrarily changed as long as the stack of stator coils 32 is depressed in a given direction intersecting the stacking direction thereof. For example, the stack of stator coils 32 may be depressed along a circumferential direction of the stator core 31 as indicated by arrow Y2 in FIG. 1.

Further, a round line having a circular cross-section may be employed as a stator coil 32 before molding in place of the line employed in the above-described embodiment.

Furthermore, the center of each of the stator coils 32 may not be aligned in the first step different from the above-described embodiment.

Numerous additional modifications and variations of the present disclosure are possible in light of the above teachings. It is therefore to be understood that within the scope of the appended claims, the present disclosure may be executed otherwise than as specifically described herein. For example, the present disclosure is not limited to the above-described method of manufacturing an armature coil and may be altered as appropriate. Further, the present disclosure is not limited to the above-described manufacturing system of manufacturing an armature coil and may be altered as appropriate.

What is claimed is:

1. A method of molding multiple armature coils installed in a slot radially extended in a stator core, each of the multiple armature coils having substantially a same cross section before a molding process along a stacking direction, each of the multiple armature coils covered with an insulating layer, the slot having a shape increasingly widened in a circumferential direction from a radial inner side to a radial outer side of the stator core, the method comprising the steps of:

shaping a vertical cross-section of each of the multiple armature coils into a rectangular state as a preparation for the molding process;

shaping a corner of each of the armature coils into a rounded state having a rounding radius before the molding process, wherein an inequality Wa>2R is met, Wa representing a width of a side of each of the armature coils excluding the corner in an orthogonal direction perpendicular to the stacking direction before the molding process, and R representing the rounding radius of each of the armature coils;

stacking the multiple armature coils to obtain a stack of armature coils in the stacking direction with all neighboring sides of the armature coils neighboring in the stacking direction tightly contacting each other as a first step of the molding process;

tightly securing first and second ends of the stack of armature coils and sandwiching the stack of armature coils with end faces of first and second clamping dies, respectively, as a second step of the molding process after completing the first step, the first and second clamping dies being respectively narrower and wider than the cross section of each of the multiple armature coils, and coaxially clamping the stack of armature coils; and gradually sandwiching and depressing the stack of armature coils from the first end of the stack to the second end of the stack with a pair of symmetrically inclined sandwiching dies in a given direction orthogonal to the stacking direction until the pair of symmetrically inclined sandwiching dies contact edges of each of the first and second clamping dies, respectively, as a third step of the molding process after completing the second step, wherein:

the pair of symmetrically inclined sandwiching dies are symmetrically inclined about a central axis of the stack of armature coils extended in the stacking direction, the pair of symmetrically inclined sandwiching dies have a narrower interval at a position closer to the edges of the first clamping die contacting the first end of the stack than an interval at another position closer to the edges of the second clamping die contacting the second end of the stack to mold the stack into substantially the same shape as the slot, and the width of the cross section of each of the armature coils in a direction orthogonal to the stacking direction before the molding process is greater than a width of the first end of a stack of armature coils obtained after molding and is less than a width of the second end of the stack of the armature coils obtained after molding.

2. The method as claimed in claim 1,
wherein the width of the side of each of the armature coils excluding the corner in the orthogonal direction perpendicular to the stacking direction before the molding process is less than the smallest width of an armature coil among armature coils obtained after molding.

3. The method as claimed in claim 1, wherein
the width of the stack of armature coils before the molding process in an orthogonal direction perpendicular to the stacking direction is an average of widths of the first and second ends of the stack of armature coils obtained after molding.

4. The method as claimed in claim 1, wherein the step of stacking multiple armature coils is performed by placing the stack of armature coils on a horizontal plane in the first step of the molding process.

5. The method as claimed in claim 1, wherein the clamping die is a fixed type die.

6. A molding system of molding multiple armature coils into a prescribed shape to be installed in a slot formed in a stator core, each of the multiple armature coils having substantially a same rectangular cross section before the molding process along a stacking direction and covered with an insulating layer, the slot having a shape increasingly widened in a circumferential direction from a radial inner side to a radial outer side of the stator core, the system comprising:

a pair of clamping dies composed of first and second clamping dies having end faces to tightly contact and secure first and second ends of a stack of armature coils, respectively, and sandwich the stack of armature coils therebetween, the stack of armature coils being stacked in a stacking direction with all neighboring sides of the armature coils neighboring in the stacking direction tightly contacting each other, the first and second clamping dies being respectively narrower and wider than the cross section of each of the multiple armature coils, and coaxially clamping the stack of armature coils; and a pair of symmetrically inclined sandwiching dies provided to gradually sandwich and depress the stack of armature coils from the first end of the stack to the second end of the stack in a given direction orthogonal to the stacking direction until the pair of symmetrically inclined sandwiching dies contact edges of each of the first and second clamping dies, respectively, the pair of symmetrically inclined sandwiching dies being symmetrically inclined about a central axis of the stack of armature coils extended in the stacking direction, wherein the pair of symmetrically inclined dies has a narrower interval at a position closer to the edges of the first clamping die facing the first end of the stack than an interval at another position closer to the edges of the second clamping die facing the second end of the stack during molding to mold the stack into substantially the same shape as the slot, and wherein a corner of each of the armature coils is shaped into a rounded corner before the molding process, and an inequality Wa>2R is met, Wa representing a width of a side of each of the armature coils excluding the corner in an orthogonal direction perpendicular to the stacking direction before the molding process, and R representing the rounding radius of each of the armature coils.

7. The manufacturing system as claimed in claim 6,
wherein a width of a plane of each of the armature coils excluding the corner the orthogonal direction perpendicular to the stacking direction before the molding process is less than the smallest width of an armature coil among armature coils obtained after the molding process.

8. The manufacturing system as claimed in claim 6, wherein the width of each of the armature coils in an orthogonal direction perpendicular to the stacking direction before the molding process is greater than a width of a first end of the stack of armature coils after the molding process and less than a width of a second end of the stack of the armature coils obtained after the molding process.

9. The manufacturing system as claimed in claim 8, wherein the width of the stack of armature coils before the molding process in a direction orthogonal to the stacking direction is an average of widths of the first and second ends of the stack of the armature coils obtained after the molding process.

10. The manufacturing system as claimed in claim 6, wherein the stack of armature coils is placed on a horizontal plane to align the armature coils thereon with each other.

* * * * *